United States Patent
Hashavit et al.

(10) Patent No.: US 9,424,530 B2
(45) Date of Patent: Aug. 23, 2016

(54) DATASET CLASSIFICATION QUANTIFICATION

(71) Applicant: International Business Machines Corporation, Armonk, NY (US)

(72) Inventors: Anat Hashavit, Haifa (IL); Roy Levin, Zihron Yakov (IL); Haggai Roitman, Yokneam Elit (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/604,765

(22) Filed: Jan. 26, 2015

(65) Prior Publication Data
US 2016/0217392 A1    Jul. 28, 2016

(51) Int. Cl.
*G06N 5/00* (2006.01)
*G06F 1/00* (2006.01)
*G06N 99/00* (2010.01)
*G06F 17/16* (2006.01)

(52) U.S. Cl.
CPC .............. *G06N 99/005* (2013.01); *G06F 17/16* (2013.01)

(58) Field of Classification Search
CPC ........... G06N 5/04; G06N 7/005; G06N 5/02; G06Q 50/01
See application file for complete search history.

(56) References Cited

U.S. PATENT DOCUMENTS

| | | | |
|---|---|---|---|
| 7,383,241 B2 | 6/2008 | Velipasaoglu et al. | |
| 7,987,144 B1 | 7/2011 | Drissi et al. | |
| 8,139,833 B2 | 3/2012 | Fain | |
| 2012/0263346 A1* | 10/2012 | Datta | G06K 9/4604 382/103 |
| 2015/0055855 A1* | 2/2015 | Rodriguez | G06F 21/16 382/159 |

FOREIGN PATENT DOCUMENTS

| | | |
|---|---|---|
| WO | 2012103625 | 8/2012 |
| WO | 2013186402 | 12/2013 |

* cited by examiner

*Primary Examiner* — Stanley K Hill
*Assistant Examiner* — Kalpana Bharadwaj
(74) *Attorney, Agent, or Firm* — Daniel Kligler (57) ABSTRACT

Methods, computing systems and computer program products implement embodiments of the present invention that include selecting a training dataset including training instances having respective training features, and applying a classifier to the training dataset, thereby generating a training classification that assigns, to each of the training instances, one of a plurality of categories, the classifier having an expected classification. A classification bias is detected in the training classification relative to the expected classification, and in response to the classification bias, a calibration matrix is defined based on the training features, and the classification bias. A production dataset including production instances is selected, and the classifier and the calibration matrix are applied to the production dataset, thereby generating a production classification quantification that assigns, to each of the production instances, one of the plurality of categories.

20 Claims, 6 Drawing Sheets

DATASET CLASSIFICATION QUANTIFICATION

CROSS-REFERENCE TO RELATED APPLICATION

This application is related to U.S. Patent Application titled "Quantification Based Classifier" filed on even date with the present application, and which is incorporated herein by reference.

FIELD OF THE INVENTION

The present invention relates generally to producing classifications from datasets, and specifically to producing accurate classification quantifications from datasets.

BACKGROUND

Classification (also known as categorization) comprises assigning a given data element of a dataset to one or more classes or categories. Classification types include single-label classification and multi-label classification. In a multi-label classification, each data element can have multiple features that are each assigned respective predefined labels (i.e., categories), and in a single-label classification, each dataset data element is assigned a single label. Classification can be used to categorize one or more data set elements such as text documents, wherein each of the documents can be assigned to multiple categories (e.g., a newspaper article can be related to both finance and technology).

The description above is presented as a general overview of related art in this field and should not be construed as an admission that any of the information it contains constitutes prior art against the present patent application.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

SUMMARY

There is provided, in accordance with an embodiment of the present invention a method, including selecting a training dataset including training instances having respective training features, applying a classifier to the training dataset, thereby generating a training classification that assigns, to each of the training instances, one of a plurality of categories, the classifier having an expected classification, detecting a classification bias in the training classification relative to the expected classification, defining, in response to the classification bias, a calibration matrix based on the training features, and the classification bias, selecting a production dataset including production instances, and applying the classifier and the calibration matrix to the production dataset, thereby generating a production classification quantification that assigns, to each of the production instances, one of the plurality of categories.

There is also provided, in accordance with an embodiment of the present invention an apparatus, including a memory configured to store a classifier, a training dataset including training instances having respective training features, and a production dataset including production instances, and a processor configured to apply a classifier to the training dataset, thereby generating a training classification that assigns, to each of the training instances, one of a plurality of categories, the classifier having an expected classification, to detect a classification bias in the training classification relative to the expected classification, to define, in response to the classification bias, a calibration matrix based on the training features, and the classification bias, and to apply the classifier and the calibration matrix to the production dataset, thereby generating a production classification quantification that assigns, to each of the production instances, one of the plurality of categories.

There is further provided, in accordance with an embodiment of the present invention a computer program product, the computer program product including a non-transitory computer readable storage medium having computer readable program code embodied therewith, the computer readable program code including computer readable program code configured to select a training dataset including training instances having respective training features, computer readable program code configured to apply a classifier to the training dataset, thereby generating a training classification that assigns, to each of the training instances, one of a plurality of categories, the classifier having an expected classification, computer readable program code configured to detect a classification bias in the training classification relative to the expected classification, computer readable program code configured to define, in response to the classification bias, a calibration matrix based on the training features, and the classification bias, computer readable program code configured to select a production dataset including production instances, and computer readable program code configured to apply the classifier and the calibration matrix to the production dataset, thereby generating a production classification quantification that assigns, to each of the production instances, one of the plurality of categories.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Classifiers are software applications used to classify instances of a dataset into multiple categories. However, when classifying a dataset into multiple categories, a given classifier may overclassify or underclassify some of the categories. In overclassification, the classifier assigns too many dataset instances to a given category, and in underclassification the classifier assigns too few dataset instances to a given category.

Embodiments of the present invention provide methods and systems for performing an enhanced classification of a dataset, in accordance with an embodiment of the present invention. When classifying a dataset comprising multiple dataset instances, systems incorporating embodiments of the present invention can improve classification quantification accuracy.

As described hereinbelow, upon a classifier classifying a training dataset into a training classification comprising a distribution of the training dataset instances among multiple categories, and detecting a bias in the resulting training classification, a calibration matrix can be defined using features of the dataset instances and the resulting categories. The classifier and the calibration matrix can then be used to classify a production dataset into a production classification quantification comprising a distribution of the production dataset instances among the multiple categories.

System Description

FIGS. 1A-1D, referred to collectively as FIG. 1, are block diagrams of a computer system 20 configured to produce an accurate classification summary for a production dataset 22, in accordance with an embodiment of the present invention. Computer 20 comprises a processor 24 and a memory 26. In addition to production dataset 22, memory 26 stores a classifier application 28, a matrix generator 30, a calibration matrix 32, a training dataset 34, a training classification 36, an intermediate classification 38, and a production classification quantification 40.

Training dataset 34 comprises multiple training instances 42, each of the training instances comprising one or more training features 44. In embodiments of the present invention, processor 24 can execute classifier application 28 in order to generate training classification 36 from training dataset 34.

Training classification 36 comprises multiple training taxonomies 46, each of the training taxonomies comprising a given training instance 42, training score data 48, a training instance score 50, and a training instance category 52. Training score data 48 comprises multiple training score elements 54, each of the training score elements comprising a given training feature 44 and a corresponding training feature score 56.

In operation, classification application 28 is configured to generate a given training taxonomy 46 for a given training instance 42 by assigning respective training features scores 56 to their corresponding training features 44, calculating training instance score 50 using the training features scores for the training features in the given training instance, and determining training instance category 52 based on the calculated training instance score.

Production dataset 22 comprises multiple production instances 58 each of the production instances comprising one or more production features 60. In embodiments of the present invention, processor 24 can execute classifier application 28 in order to generate intermediate classification 38 from production dataset 22.

Intermediate classification 38 comprises multiple intermediate taxonomies 62, each of the intermediate taxonomies comprising a given production instance 58, intermediate score data 64, an intermediate instance score 66, and an intermediate instance category 68. Intermediate score data 64 comprises multiple intermediate score elements 70, each of the intermediate score elements comprising a given production feature 60 and a corresponding intermediate feature score 72.

In operation, classification application 28 is configured to generate a given intermediate taxonomy 62 for a given production instance 58 by assigning respective intermediate instance scores 66 to their corresponding production features 60, calculating intermediate instance score 66 using the intermediate feature scores for the production features in the given production instance, and determining intermediate instance category 68 based on the calculated intermediate instance score.

Production classification quantification 40 comprises multiple production taxonomies 74 each of the production taxonomies comprising a given production instance 58, production score data 76, a production instance score 78, and a production instance category 80. Production score data 76 comprises multiple production score elements 82, each of the production score elements comprising a given production feature 60 and a corresponding intermediate feature score 84.

In embodiments of the present invention, processor 24 is configured to apply calibration matrix 32 to intermediate classification 38, thereby generating production classification quantification 40. Therefore, each given production taxonomy 74 has a corresponding intermediate taxonomy 62.

Calibration matrix 32 comprises multiple calibration matrix entries 86, each of the calibration matrix entries comprising a calibration matrix feature 88 and a calibration adjustment factor 90. The calculation of calibration adjustment factors 90 is described hereinbelow in the description referencing FIG. 4.

In operation, processor 24 is configured to generate a given production taxonomy 74 for a given production instance 58 by matching each given production feature 60 in the corresponding intermediate taxonomy 62 to a given calibration matrix feature 88 in a given calibration matrix entry 86, and to perform a calculation that comprises applying the calibration adjustment factor in the given calibration matrix entry to the intermediate feature score in the corresponding intermediate taxonomy 62. Processor 24 can then store the result of the calculation to production feature score 84 in the given production taxonomy. Upon calculating the production feature scores for all production features 60 in the given production taxonomy, processor 24 can calculate, using the production feature scores, the production instance score.

Features 44, 60 and 88 can all be subsets of a global set of features (not shown). For example, features 88 may comprise words in a dictionary, the training and the production instances may comprise books and publications in a library, and features 44 and 60 may comprise words in the books and the publications. Likewise categories 52, 68 and 80 may all comprise the same category labels such as "science fiction", "biography", and "espionage" from a set of categories (not shown) that can be assigned to features 44, 60 and 88 with varying weights as is known in the art.

Processor 24 typically comprises a general-purpose computer, which is programmed in software to carry out the functions described herein. The software may be downloaded to computer 20 in electronic form, over a network, for example, or it may be provided on non-transitory tangible media, such as optical, magnetic or electronic memory media. Alternatively, some or all of the functions of processor 24 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Producing Accurate Classification Quantifications

Figure 1A:
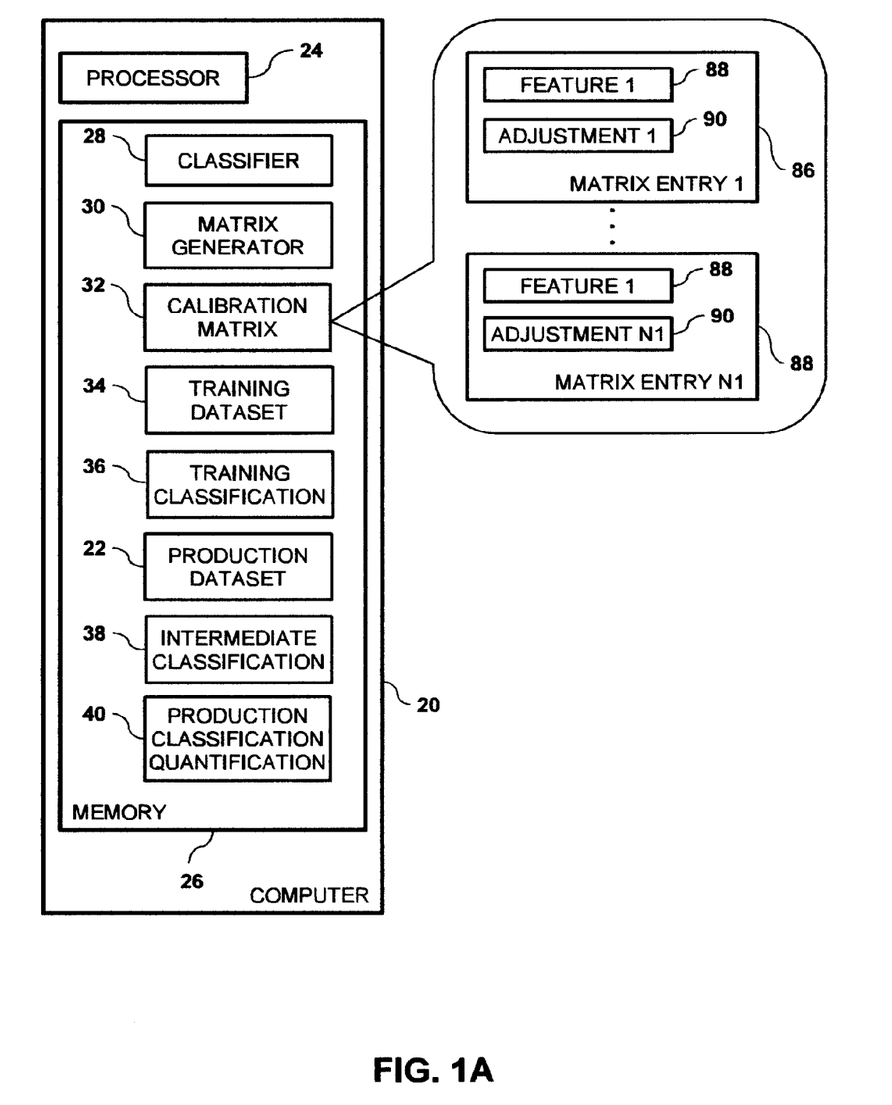
FIGS. 1A, 1B, 1C and 1D are block diagrams of a computer system configured use a calibration matrix in order to produce an accurate classification quantification for a production dataset, in accordance with an embodiment of the present invention.
Figure 1B:
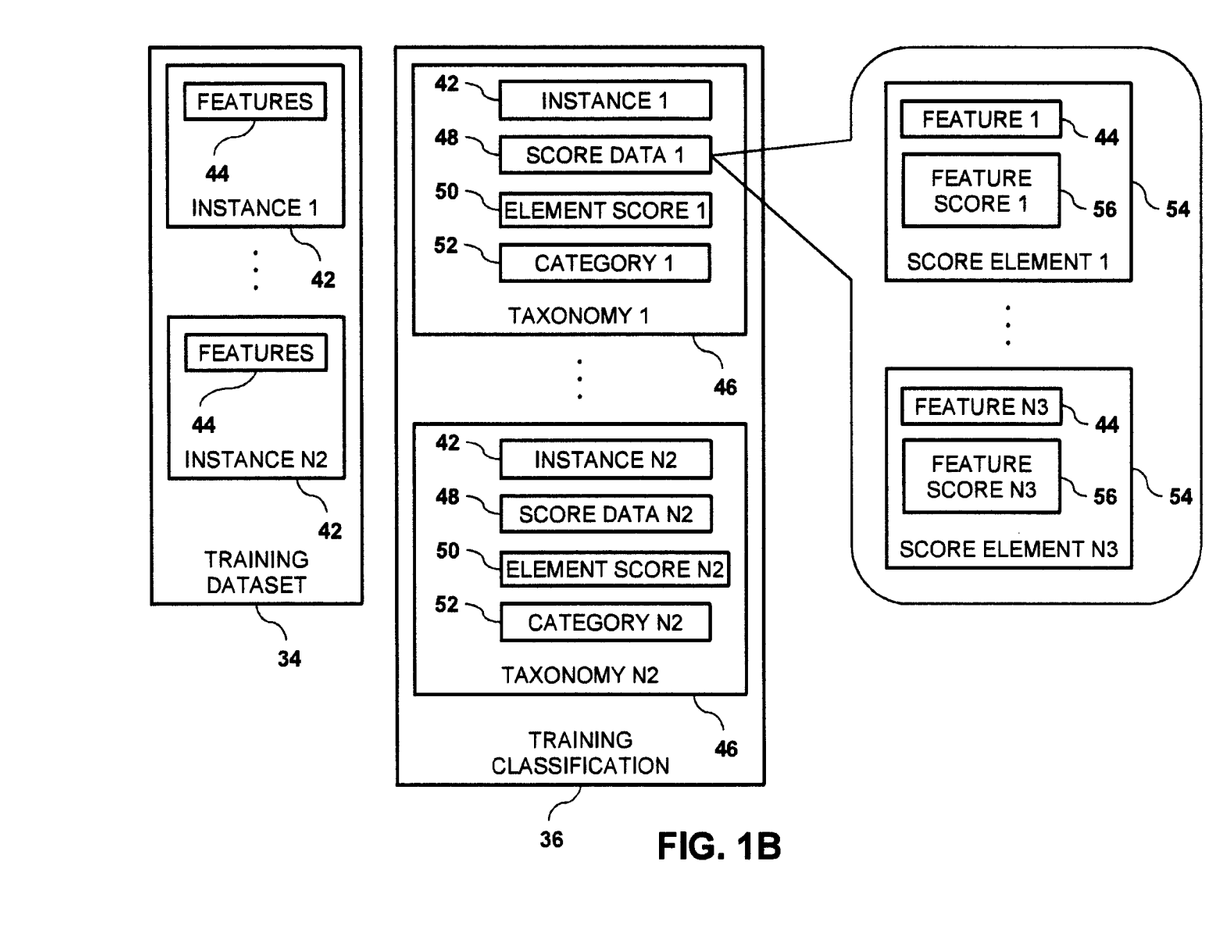
Figure 1C:
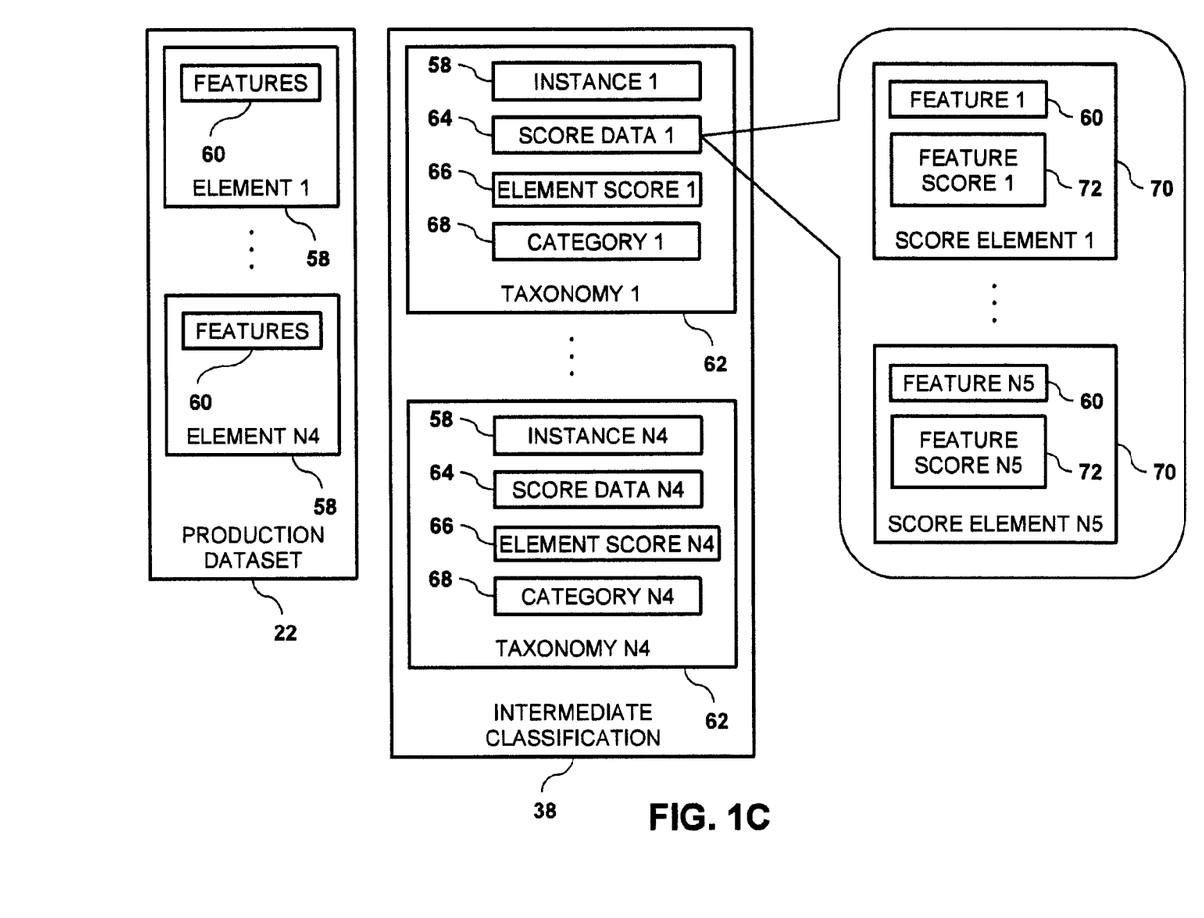
Figure 1D:
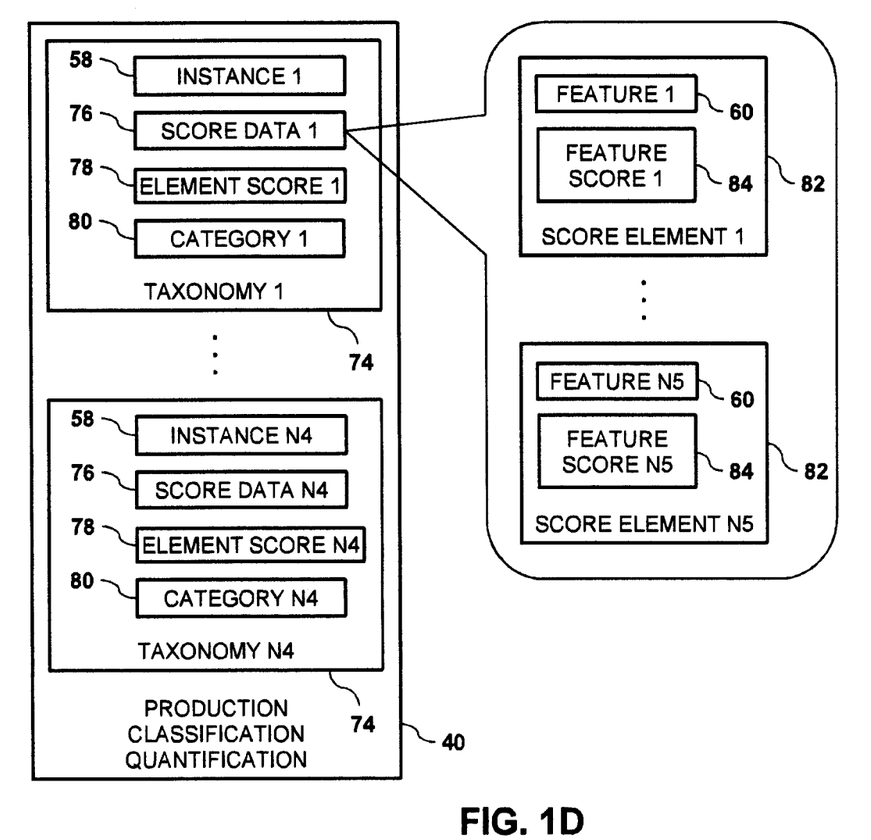
Figure 2:
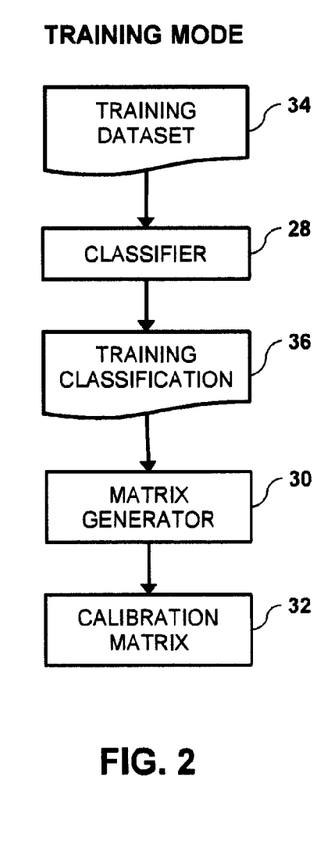
FIG. 2 is a flow diagram that schematically illustrates components of the computer system defining the calibration matrix, in accordance with an embodiment of the present invention.

FIG. 2 is a flow diagram that schematically illustrates components of computer system 20 that define calibration matrix 32 during a "training mode", in accordance an embodiment of the present invention. In the training mode, training dataset is input into classifier application 28, and the classifier application generates training classification 36. Training classification 36 is then input into matrix generator 30, and the matrix generator generates calibration matrix 32.

Figure 3:
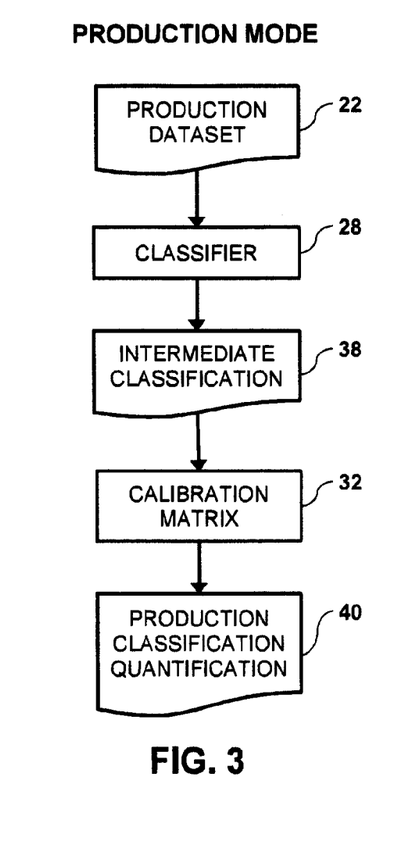
FIG. 3 is a flow diagram that schematically illustrates components of the computer system using the calibration matrix to produce a quantification classification, in accordance an embodiment of the present invention.

FIG. 3 is a flow diagram that schematically illustrates components of computer system 20 producing a classification quantification for production dataset 22 during a "production mode", in accordance an embodiment of the present invention. In the production mode, production dataset 22 is input into classifier application 28, and the classifier generates intermediate classification 38. Processor 24 can than apply calibration matrix 32 to intermediate classification 38 in order to generate production classification quantification 40.

As explained hereinbelow, defining and applying a quantifier such as calibration matrix 32 comprises generating an expected distribution (not shown) for production quantification classification quantification 40. Therefore, applying the calibration matrix ensures that a distribution of the resulting production quantification classification is in accordance with the expected distribution.

In embodiments of the present invention, output from classifier application 28 is used as an input to a quantifier comprising calibration matrix 32. In operation, when applying a quantifier such as calibration matrix 32 to production dataset 22, processor 24 analyzes a number of features 60 classified to each category 68. In other words, processor 24 does not analyze the feature-category pairing in each individual taxonomy 62.

Figure 4:
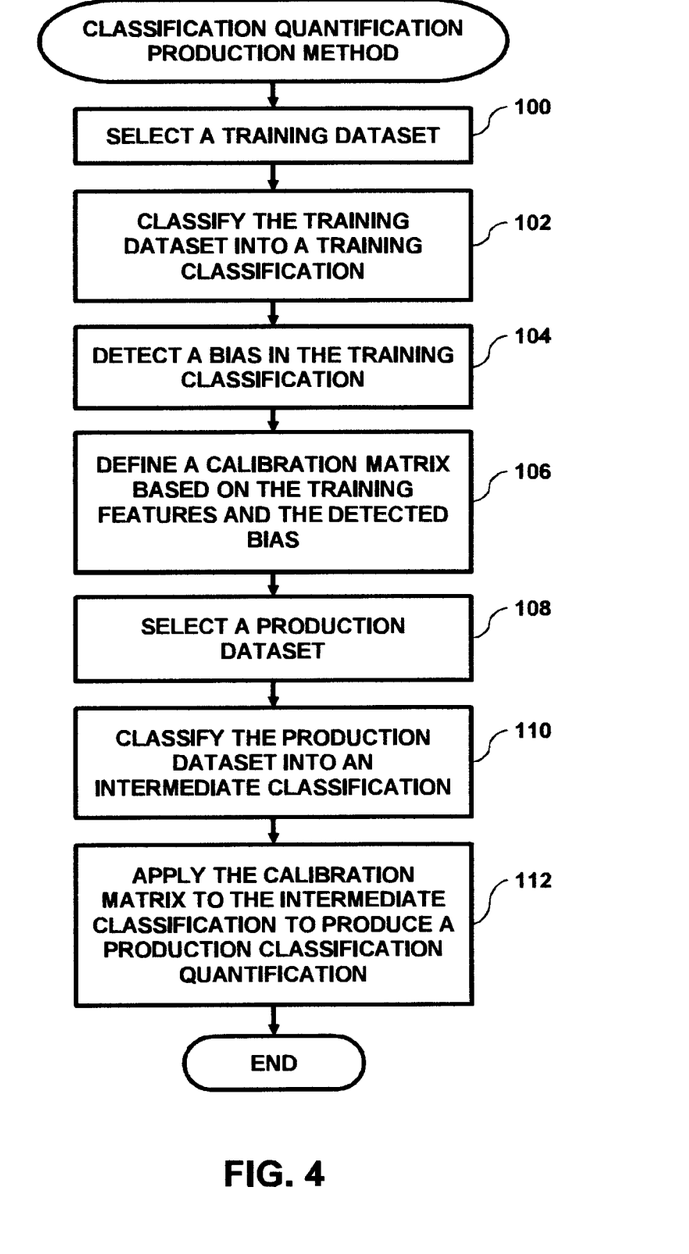
FIG. 4 is a flow diagram that schematically illustrates a method produce the quantification classification, in accordance an embodiment of the present invention.

FIG. 4 is a flow diagram that schematically illustrates a method of producing an accurate classification quantification for production dataset 22, in accordance with an embodiment of the present invention. In embodiments of the present invention, producing an accurate classification quantification for production dataset 22 results in a minimal underclassification and/or overclassification of categories 80 in production classification quantification 40.

In a first select step 100, processor 24 selects training dataset 34 comprising training instances 42 having training features 44. Training data set is typically an annotated dataset. In other words, each instance 42 in training dataset 34 is typically an annotated with an expected category (not shown), thereby enabling processor 24 to produce the expected classification.

In a first classification step 112, the processor classifies the training dataset into training classification 36. To classify training dataset 34, processor 24 can assign, to each training instance category 52, a given category from a set of categories (not shown).

In a detection step 104, processor 24 detects a classification bias in the training classification, and in a definition step 106, the processor uses features 44 and the detected classification bias to define calibration matrix 32, as described hereinbelow. The detected bias comprises one or more underclassifications and/or overclassifications with regard to an expected classification of the training dataset.

In embodiments of the present invention, training classification 36 typically in annotated and has an expected classification (i.e., distribution of categories 52). For example, if training set 34 comprises books in a library, and categories 52 comprise book genres, then the expected classification can be an expected distribution of the books in the book genres, and the classification bias comprises a deviation from the expected distribution.

In embodiments of the present invention, processor 24 determines the expected classification and detects the classification bias when defining a quantifier comprising calibration matrix 32, as described hereinbelow. Detecting the classification bias is a result of a supervised learning technique, where a "ground truth" (i.e., the training dataset and its respective annotations) is supplied by a reliable source.

In the example described supra, an example of the classification bias may comprise classifier application 28 "overweighting" a given feature (i.e., a given word) in the books. For example, if multiple books contain the word "war", the classifier may overclassify these books to a "conflict" category. In this example, the overclassification comprises too many books being assigned to the conflict category. Therefore, using features 44 to define calibration matrix 32 may comprise analyzing the expected distribution against training classification 36.

In embodiments of the present invention, processor 24 can approximate each label-feature (i.e., label-category) by a "mixture" of the following probabilities:

$$P(c, f | D) = \sum_{c' \in C} P_\phi(c', f | D) \cdot x(c, c') \quad (1)$$

Subsequent to approximating each label-feature combination, processor 24 can correct any bias (i.e., in the training classification and the intermediate classification) by approximating calibration coefficients x(c, c'). To approximate x(c, c'), let X(C, C') comprises the calibration matrix such that for a given training data d:

$$P(C,F|D)=P_\phi(C,F|d)X(C,C) \quad (2)$$

Processor 24 can then calculate calibration matrix 32 as follows:

$$X(C,C)=P_\phi(C,F|D)^{-1}P(C,F|d) \quad (3)$$

In embodiments of the present invention, calibration matrix (i.e., X(C,C)) can be used to improve a label count estimation of a new dataset D. Using classier φ, processor 24 can:

Produce matrix $P_\phi$ (C, F|D).

Detect that P(C|D)=P(C,F|D) $\vec{1}$, where P(C|D) denotes the prior label probabilities vector given D, and $\vec{1}$ is a vector of 1 ones. Since P(C|D) is unknown, we can derive $P_\phi(C|D)=P_\phi(C,F|D)X(C,C)\vec{1}$ as its approximation.

Finally, let μ(C|D) denote a vector of expected label counts μ(c|D), calculated as:

$$\mu(C|D)=|D|\cdot P_\phi(C,F|D)X(C,C)\vec{1} \quad (4)$$

In some embodiments, the classification bias may comprise a respective individual bias for each calibration matrix feature 88 in calibration matrix 32. In these embodiments, processor 24 can calculate a given calibration adjustment factor 90 for a given matrix entry 86 as a value that corrects the classification bias for calibration matrix feature 88 in the given matrix entry.

Returning to the flow diagram, processor 24 selects production dataset 22 comprising production instances 58 having production features 60 in a second select step 108, and classifies the production dataset into intermediate classification 38 in a second classification step 110. Production dataset 22 is typically an unseen dataset that has no annotations and has not been processed by classifier 28 and calibration matrix 32.

Finally, in an application step 102, processor applies calibration matrix 32 to intermediate classification 38 using embodiments described hereinabove, thereby generating production classification quantification 40, and the method ends. As described supra, to classify production dataset 40, processor 24 can assign, to each production instance category 80, a given category from the set of categories described hereinabove.

In embodiments of the present invention, training classification 36 may have a first classification bias (i.e., a deviation of categories 52 from an expected distribution), intermediate classification 38 may have an intermediate classification bias (i.e., a deviation of intermediate instance categories 68 from the expected distribution), and production classification quantification 40 may have a production classification bias (i.e., a deviation of production instance categories 80 from the expected distribution). By using calibration matrix 32, systems incorporating embodiments of the invention can generate production classification quantification 40 so that the production classification bias is less than the intermediate classification bias.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    selecting a training dataset comprising training instances having respective training features;
    applying a classifier to the training dataset, thereby generating a training classification that assigns, to each of the training instances, one of a plurality of categories, the classifier having an expected classification;
    detecting a classification bias in the training classification relative to the expected classification;
    defining, in response to the classification bias, a calibration matrix based on conditional probabilities of features of a production dataset given occurrences of corresponding training features;
    selecting a production dataset comprising production instances; and
    applying the classifier and the calibration matrix to the production dataset, thereby generating a production classification quantification that assigns, to each of the production instances, one of the plurality of categories.

2. The method according to claim 1, wherein the training set comprises an annotated training set and the production dataset comprises an unseen dataset.

3. The method according to claim 1, wherein the calibration matrix comprises multiple matrix entries, each of the matrix entries comprising a given feature and an adjustment factor.

4. The method according to claim 3, wherein the classification bias comprises a respective individual bias for each of the features.

5. The method according to claim 4, wherein defining the calibration matrix comprises calculating the respective adjustment factor for each of the matrix entries based on the respective individual bias.

6. The method according to claim 1, wherein applying the classifier and the calibration matrix comprises applying the classifier to the production dataset, thereby generating an intermediate classification, and applying the calibration matrix to the intermediate classification, thereby generating the production classification quantification.

7. The method according to claim 6, wherein the classification bias comprises a training classification bias, and wherein the intermediate classification has an intermediate classification bias relative to the expected classification, and wherein the production classification quantification has a production classification bias that is less than the intermediate classification bias.

8. An apparatus, comprising:
    a memory configured to store a classifier, a training dataset comprising training instances having respective training features, and a production dataset comprising production instances; and
    a processor configured:
    to apply a classifier to the training dataset, thereby generating a training classification that assigns, to each of the training instances, one of a plurality of categories, the classifier having an expected classification,
    to detect a classification bias in the training classification relative to the expected classification,
    to define, in response to the classification bias, a calibration matrix based on conditional probabilities of features of the production dataset given occurrences of corresponding training features;
    to apply the classifier and the calibration matrix to the production dataset, thereby generating a production classification quantification that assigns, to each of the production instances, one of the plurality of categories.

9. The apparatus according to claim 8, wherein the training set comprises an annotated training set and the production dataset comprises an unseen dataset.

10. The apparatus according to claim 8, wherein the calibration matrix comprises multiple matrix entries, each of the matrix entries comprising a given feature and an adjustment factor.

11. The apparatus according to claim 10, wherein the classification bias comprises a respective individual bias for each of the features.

12. The apparatus according to claim 11, wherein the processor is configured to define the calibration matrix by calculating the respective adjustment factor for each of the matrix entries based on the respective individual bias.

13. The apparatus according to claim 8, wherein the processor is configured to apply the classifier and the calibration matrix by applying the classifier to the production dataset, thereby generating an intermediate classification, and applying the calibration matrix to the intermediate classification, thereby generating the production classification quantification.

14. The apparatus according to claim 13, wherein the classification bias comprises a training classification bias, and wherein the intermediate classification has an intermediate classification bias relative to the expected classification, and wherein the production classification quantification has a production classification bias that is less than the intermediate classification bias.

15. A computer program product, the computer program product comprising:
    a non-transitory computer readable storage medium having computer readable program code embodied therewith, the computer readable program code comprising:
    computer readable program code configured to select a training dataset comprising training instances having respective training features;
    computer readable program code configured to apply a classifier to the training dataset, thereby generating a training classification that assigns, to each of the training instances, one of a plurality of categories, the classifier having an expected classification;
    computer readable program code configured to detect a classification bias in the training classification relative to the expected classification;

computer readable program code configured to define, in response to the classification bias, a calibration matrix based on conditional probabilities of features of a production dataset given occurrences of corresponding the training features computer readable program code configured to select a production dataset comprising production instances; and computer readable program code configured to apply the classifier and the calibration matrix to the production dataset, thereby generating a production classification quantification that assigns, to each of the production instances, one of the plurality of categories.

16. The computer program product according to claim 15, wherein the training set comprises an annotated training set and the production dataset comprises an unseen dataset.

17. The computer program product according to claim 15, wherein the calibration matrix comprises multiple matrix entries, each of the matrix entries comprising a given feature and an adjustment factor.

18. The computer program product according to claim 17, wherein the classification bias comprises a respective individual bias for each of the features, and wherein the computer readable program code configured to define the calibration matrix by calculating the respective adjustment factor for each of the matrix entries based on the respective individual bias.

19. The computer program product according to claim 15, wherein the computer readable program code is configured to apply the classifier and the calibration matrix by applying the classifier to the production dataset, thereby generating an intermediate classification, and applying the calibration matrix to the intermediate classification, thereby generating the production classification quantification.

20. The computer program product according to claim 19, wherein the classification bias comprises a training classification bias, and wherein the intermediate classification has an intermediate classification bias relative to the expected classification, and wherein the production classification quantification has a production classification bias that is less than the intermediate classification bias.

* * * * *